United States Patent
Raaphorst

[11] 3,927,859
[45] Dec. 23, 1975

[54] BLOW OFF VALVE FOR A BLAST FURNACE

[75] Inventor: Cornelis Raaphorst, Heerhugowaard, Netherlands

[73] Assignee: Hoogovens Ijmuiden, B.V., Ijmuiden, Netherlands

[22] Filed: Dec. 18, 1973

[21] Appl. No.: 425,822

[30] Foreign Application Priority Data
Dec. 22, 1972 Netherlands.................. 7217481

[52] U.S. Cl................... 251/147; 266/26; 266/31; 251/63.5
[51] Int. Cl.².......................... F16K 1/24
[58] Field of Search........... 251/147, 299, 62, 63.4, 251/63.6, 333, 86; 137/329.4, 522, 523; 266/26, 27, 31

[56] References Cited
UNITED STATES PATENTS

| | | | |
|---|---|---|---|
| 862,626 | 8/1907 | Fisk | 251/147 X |
| 945,151 | 1/1910 | Blauvelt | 137/522 |
| 1,464,116 | 8/1923 | Steudel | 266/26 |
| 1,480,155 | 1/1924 | Darling | 137/522 |
| 2,050,145 | 8/1936 | Wiseman | 251/147 |
| 2,596,805 | 5/1952 | Banker | 251/147 X |
| 2,726,856 | 12/1955 | Maag | 266/27 |
| 3,037,737 | 6/1952 | Konemund et al. | 251/299 X |
| 3,442,484 | 5/1969 | Carr et al. | 251/147 X |
| 3,588,068 | 6/1971 | Huntington | 266/31 |
| 3,704,992 | 12/1972 | Nieboer | 266/27 X |

*Primary Examiner*—William R. Cline
*Attorney, Agent, or Firm*—Stevens, Davis, Miller & Mosher

[57] ABSTRACT

A valve arranged to close an end of a conduit through which hot, pressurized gas is vented on opening of the valve, especially a blow off valve in a blast furnace, has a U-shaped yoke embracing the conduit with the free ends of its arms mounted for pivoting about an axis which is fixed relative to the conduit and is spaced along the conduit from the said end. At the other end of its arms, the yoke carries a valve closure member which seats on a valve seat to close the conduit, biassing means resiliently urging the closure member into engagement with the valve seat, and lifting means operable to move the closure member away from the valve seat. The closure member and biassing and lifting means can thus be moved out of the venting gas stream by pivoting of the yoke.

6 Claims, 5 Drawing Figures

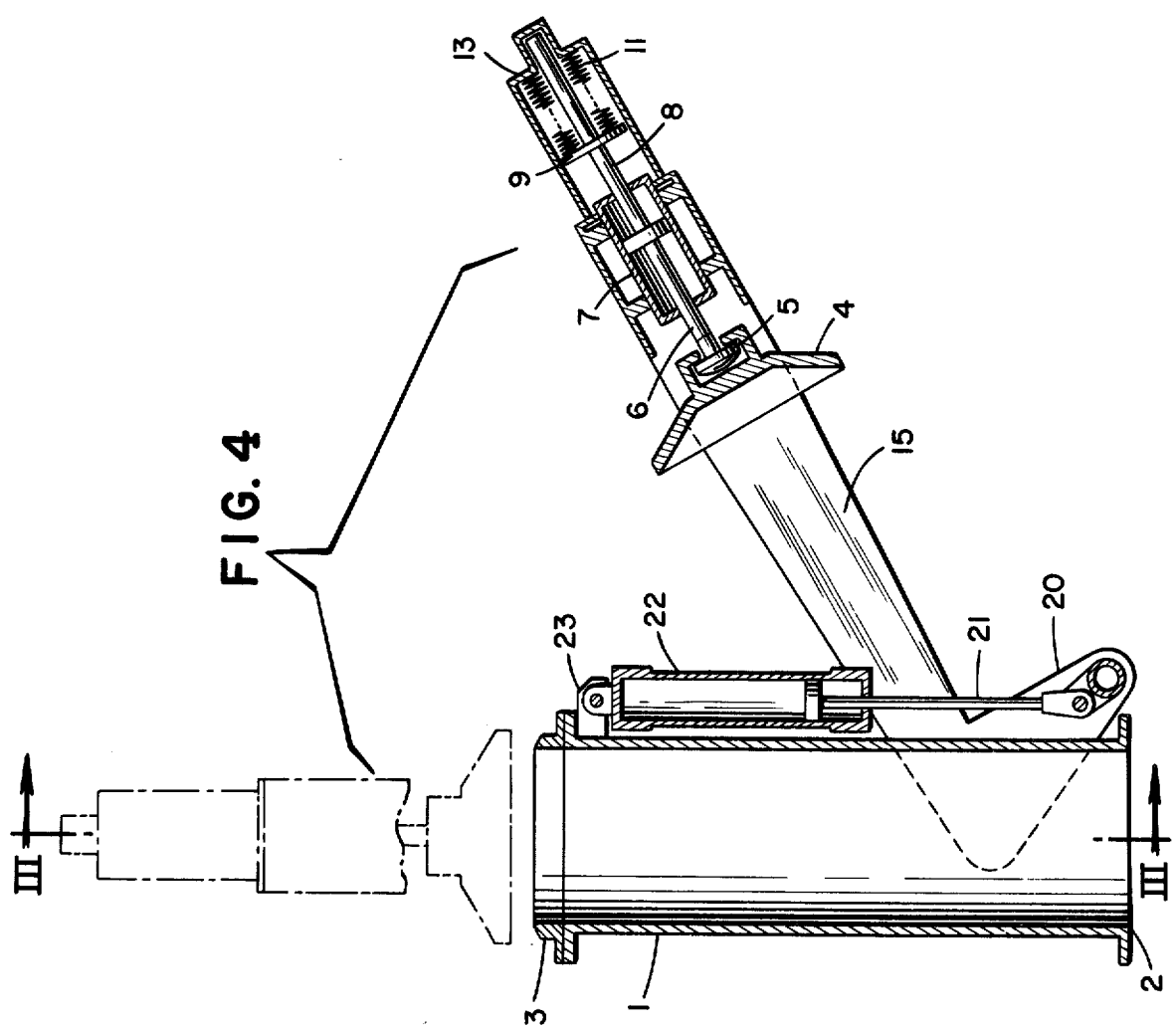
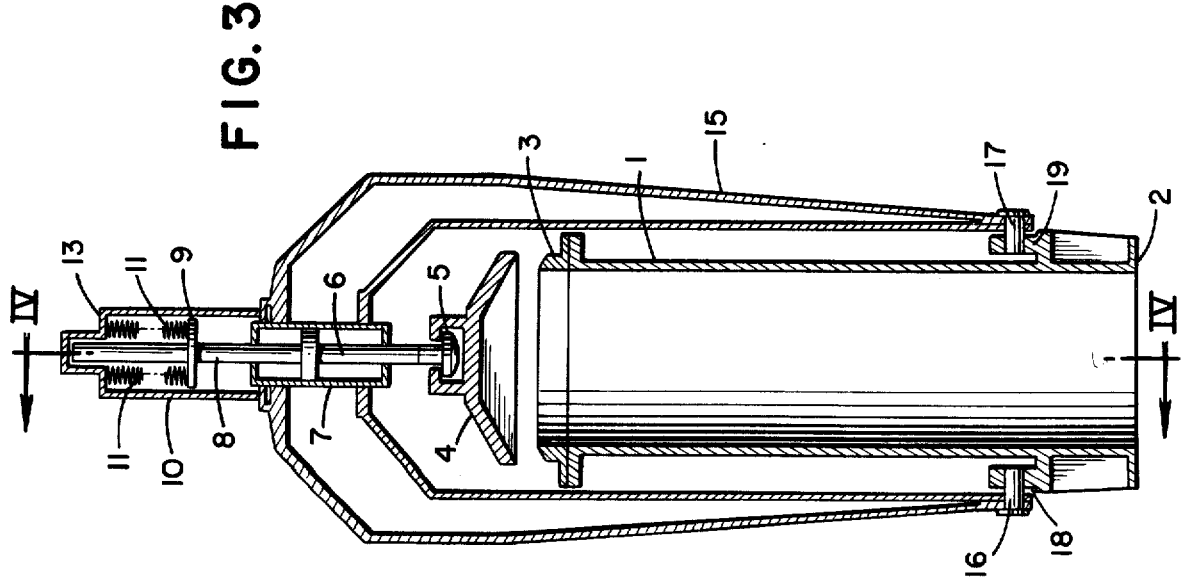

BLOW OFF VALVE FOR A BLAST FURNACE

FIELD OF THE INVENTION

This invention relates to a valve arranged to close an end of a conduit through which hot, pressurized gas is vented on opening of the valve, and is particularly, though not exclusively, applicable to a blow off valve for a blast furnace.

BACKGROUND OF THE INVENTION

A blow off valve for a blast furnace is normally placed at the top of the furnace and is used to equalize the gas pressure in the furnace with atmospheric pressure when the furnace is put out of operation (i.e. when the furnace is "blown out" or "blown down"). The valve is placed at the end of a conduit known as a blow off main and includes a valve plate and a valve seat, the plate being pressed by springs onto the seat which is at the end of the blow off main to close it, and lifting means is provided for the removal of the valve plate against the spring force from the valve seat in order to open the valve.

When the blast furnace is put out of operation the hot gas still present in the furnace flows through the opened blow off main to the atmosphere, and to diminish the danger of explosion steam is injected into the blow off main. It is a drawback of the usual type of valve that in the open position of the valve the gas and vapour stream emerging from the furnace and heavily laden with dust particles, e.g. ore and coke, hits the valve plate so that the face which is required to cooperate with the face of the valve seat is highly liable to damage or becomes filthy. Moreover the blown off gas has a high temperature, sometimes several hundred degrees centrigrade, which increases the likelihood of damage to the blow off valve.

The invention aims to provide a blow off valve for a blast furnace in which these drawbacks are absent or at least ameliorated and further to provide a valve which may be useful in analogous situations.

SUMMARY OF THE INVENTION

According to the invention there is provided valve closing an end of a conduit through which hot pressurized gas is vented on opening of the valve, the valve having a. a valve seat at the conduit end,
b. a closure member movable into and out of engagement with the seat,
c. biassing means resiliently biassing the closure member against the seat,
d. lifting means operable to move the closure member away from the seat against the force of the biassing means, and
e. a U-shaped yoke embracing the conduit and pivotally mounted for pivoting about an axis which is fixed in relation to the conduit and is spaced longitudinally along the conduit from the end, the closure member, biassing means and lifting means being carried by the yoke so that they can be moved out of the venting gas stream by pivoting of the yoke on opening of the valve.

Preferably the lifting means comprises an assembly of a hydraulic cylinder and piston and a piston rod carrying the valve closure member, the cylinder being mounted on the U-shaped yoke.

If the biassing means comprises a plurality of dish springs mounted on a spring box secured to the yoke and acting between the box and an abutment secured on an extension of the piston rod beyond the cylinder, a good and logical force distribution is obtained. The valve closure member is preferably connected to the piston rod either by a universal, e.g. spherical, joint or by a dish spring secured to the piston rod.

So that the engaging faces of the closure member and valve seat come as little as possible in contact with the gas stream, preferably the valve seat at the end of the conduit is placed on the outside of the conduit at the end opening thereof and the closure member at least partly covers or overlaps the valve seat in closed position of the valve. In order to allow for small variations of the relative location of the closure member and valve seat, preferably the valve seat is frusto-conical and the portion of the closure member which engages therewith is spherical.

Means for pivoting the U-shaped yoke may be provided for example a hydraulic and piston acting on a crank arm fast with the yoke may be provided.

The hydraulic system for the valve preferably includes interlocking means which ensure that pivoting of the yoke to carry the closure member and biassing and lifting means away from the conduit end can be performed only when the closure member is out of engagement with the valve seat.

BRIEF DESCRIPTION OF THE DRAWINGS

In order that the invention may be yet more fully understood and carried into effect, a preferred embodiment will be described, by way of non-limitative example and with reference to the accompanying digrammatic drawings, in which:

FIG. 3 is a longitudinal cross-section taken in the same plane as FIG. 1, i.e. on the line III—III of FIG. 4, and showing the closure member lifted off the valve seat.

FIG. 4 is a longitudinal cross-section taken in the same plane as FIG. 2 i.e. on the line IV—IV of FIG. 3 showing by the chain dotted lines some parts in the location of FIG. 3 and by the full lines the position with the U-shaped yoke pivoted aside.

DESCRIPTION OF THE PREFERRED EMBODIMENT

Figure 2:
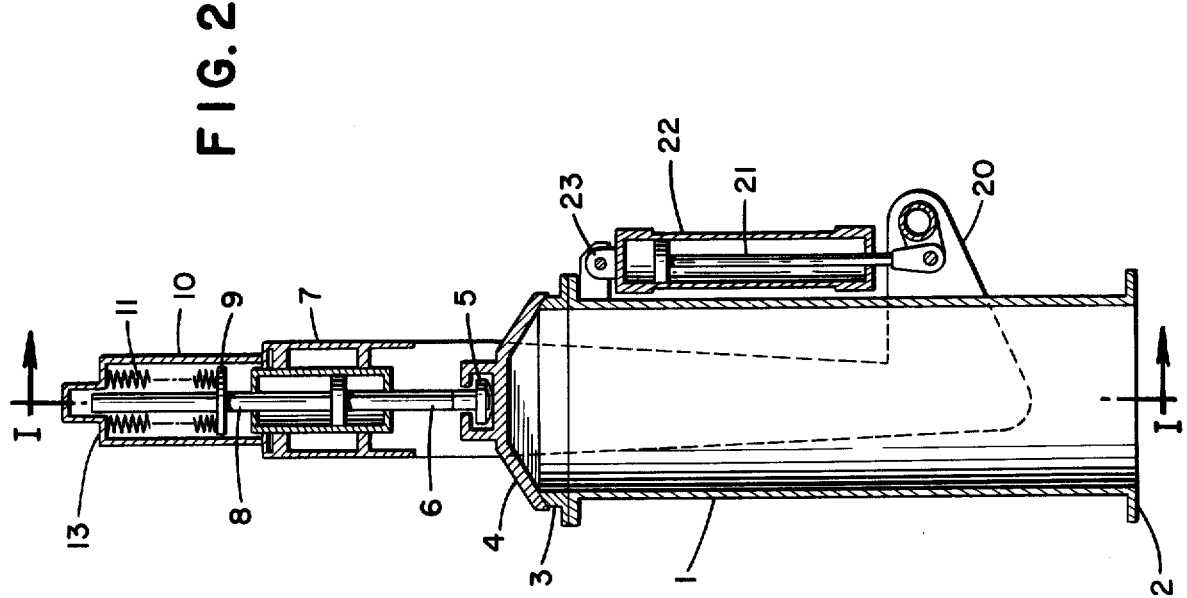
FIG. 2 is a longitudinal cross-section on the line II—II of FIG. 1.
Figure 1:
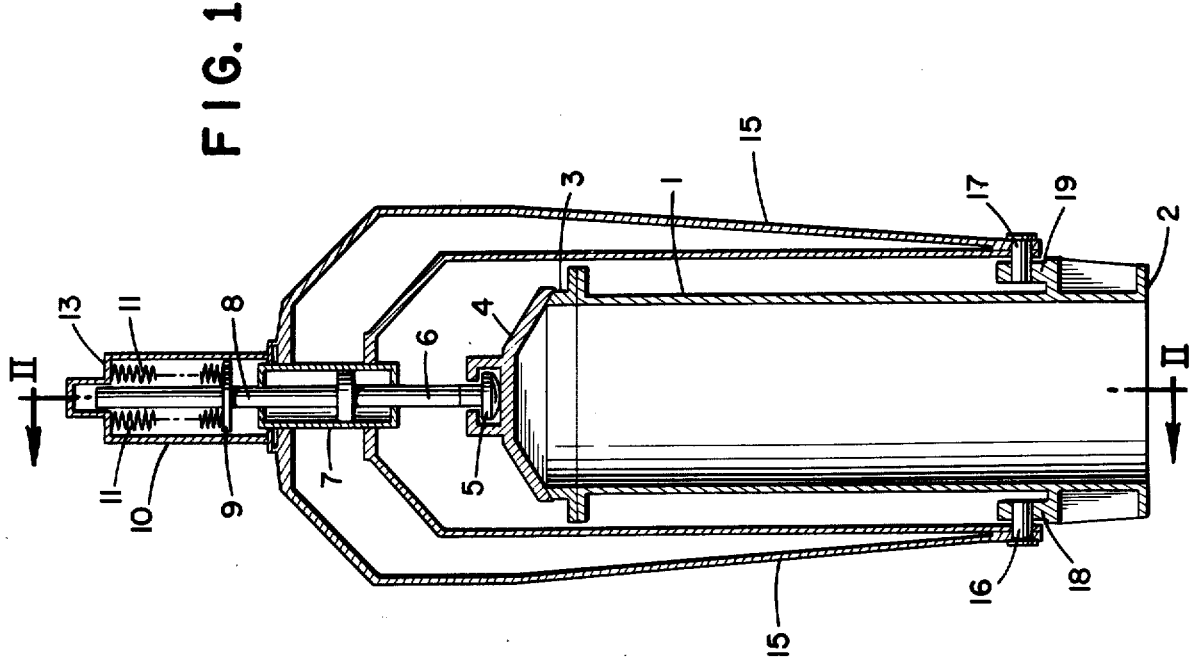
FIG. 1 is a longitudinal cross-section of a conduit having a valve embodying the invention, in particular a blow off valve of a blast furnace.
Figure 5:
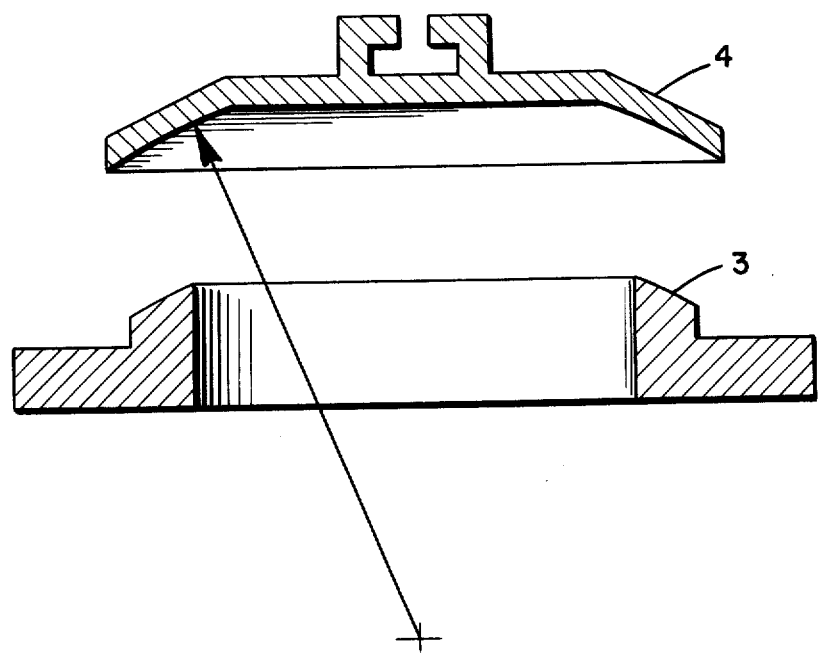
FIG. 5 is an enlarged view of the blow off valve and valve seat.

The blow off main 1 is secured by a flange 2 at the top of a high blast furnace (not shown). The main is cylindrical. At the end of the main 1 is a valve seat 3 which cooperates with a movable closure member in the form of a valve disc 4. The valve seat 3 lies on the outside face of the main and is somewhat set back from the opening of the main 1. The disc 4 overlaps the valve seat 3 somewhat in the closed position of the valve (FIGS. 1 and 2).

The valve seat 3 is frusto-conical with a taper towards the closure member and the surface of the valve disc 4 which engages therewith is spherical, so that in the closed position of the valve in all relative positions of the valve disc and the seat a line seal should be obtained. Manufacture is also simplified. The valve disc 4 is by means of a spherical joint 5 connected to a piston rod 6 of a piston which is movable in a cylinder 7. Instead of a spherical joint a disc spring acting as such a joint can be used, and has the extra advantage of absorbing shock when the valve is closed. An extension of the piston rod 6 carries an abutment in the form of a disc spring 9. A set of springs 11 are located in a spring box 10 and act to transmit force resiliently between a cover 13 of the box and the disc spring 9.

The spring box 10 being mounted on the conduit 1 as will be described below, the springs 11 resiliently bias the valve disc 4 against the valve seat 3, thus maintaining closure of the valve against the pressure in the conduit 1. The cylinder 7 is also mounted on the conduit 1 as will be described and can be operated to lift the valve disc 4 off the valve seat 3 against the action of the springs 11.

The cylinder 7 and spring box 10 are in fact mounted on a U-shaped yoke 15 which is constituted by two parallel arms rigidly interconnected above the end of the main to provide the closed end of the U-shape and rotatably mounted by pivots 16, 17 in supports 18, 19 fast with the main 1 on a common rotational axis. The pivots 16, 17 are on either side of the main 1 thus providing the open end of the U-shape. The U-shaped yoke 15 thus embraces the main 1 and is pivotable about an axis which is fixed relative to the main 1 and is spaced along the main 1 in its longitudinal direction from the end of the main 1. The arms of the U-shaped yoke 15 extend along the main and are symmetrical about a diametral plane of symmetry of the main, i.e. the plane of FIGS. 1 and 3. The rotational axis of the yoke 15 is perpendicular to this plane, and is also a diameter of the main.

The arms of the yoke 15 are fast with crank arms 20 to which is connected a piston rod 21 of a piston and cylinder assembly 22, the latter being mounted at 23 on the main 1 adjacent the end of the main. Operation of the piston and cylinder assembly 22 causes rotation of the yoke 15 about the pivots 16, 17.

When the blast furnace is temporarily stopped, the pressure in it should be brought to atmospheric pressure and for this purpose the blow off valve is opened, as follows: the hydraulic cylinder 7 initially in the position shown in the FIG. 1 is operated by pumping oil under the piston, so that the piston moves upward against the spring force of the set of springs 11. Then the situation shown in FIG. 3 is obtained and venting of the hot, pressurized gases in a stream commences.

Subsequently the hydraulic cylinder 22 is operated by pumping oil above the piston. By the lever action the yoke 15 is pivoted from the position shown in FIG. 2 (but with the valve open) to the position shown by full lines in FIG. 4, in which the gas stream venting from the blast furnace can no longer impinge on the valve disc 4 or the other parts carried by the yoke 15. The pivoting movement of the yoke 15 should be performed as quickly as possible, to minimize the exposure of the valve parts to the venting gas. The valve is closed by the reverse actions.

In the hydraulic control system of the cylinders 7, 22, interlocking means are provided which ensure that the cylinder 22 is not operated to pivot the yoke 15 until the cylinder 7 has operated to lift the valve disc 4 off the valve seat 3. The control system and interlocking means are not shown in the drawings, and their provision will be no problem to one skilled in the art.

The invention is not limited to a blow off valve of a blast furnace, and may also be applied to other furnaces where hot gas or gasses are under pressure and require to be vented.

What is claimed is:

1. Blow-off valve of a blast furnace closing an end of a conduit through which hot pressurized gas is vented on opening of the valve, the valve having,
   a. a valve seat at the conduit end,
   b. a closure member movable into and out of engagement with the seat,
   c. biassing means resiliently biassing the closure member against the seat,
   d. lifting means operable to move the closure member away from the seat against the force of the biassing means, and
   e. a U-shaped yoke embracing the conduit and pivotally mounted for pivoting about an axis which is fixed in relation to the conduit and is spaced longitudinally along the conduit from the end, the closure member, biassing means and lifting means being carried by the yoke so that they can be moved out of the venting gas stream by pivoting of the yoke on opening of the valve, said lifting means comprise a hydraulic cylinder and piston assembly having a piston rod connecting the closure member to the piston, the cylinder being mounted on the yoke, said biassing means comprise a plurality of disc springs located in a spring box mounted on the yoke beyond the cylinder from the closure member, the springs acting to transmit the biassing force between the spring box and an abutment secured to an extension of the piston rod.

2. Valve according to claim 1 wherein the closure member is connected to the piston rod by a universal joint.

3. Valve according to claim 1 wherein the valve seat is frusto-conical and is located on the outside face of the conduit at the end thereof, and the closure member has a spherical surface portion and at least partly covers the valve seat in the closed position of the valve.

4. Valve according to claim 1 including means operable to pivot the yoke.

5. Valve according to claim 4 wherein the means operable to pivot the yoke is a hydraulic cylinder and piston assembly acting on a crank arm fast with the yoke.

6. Valve according to claim 1 wherein the conduit is cylindrical at least adjacent the said end and the yoke comprises a pair of arms which extend longitudinally of the conduit from the said end and are symmetrically located with respect to a diametral plane of the conduit, each arm having two ends, of which a first pair from different arms are rigidly interconnected to provide the said U-shape and a second pair are respectively rotatably secured to the conduit at points spaced along the conduit from the said end on a common rotational axis perpendicular to the said plane and diametral of the conduit, which axis is the said pivoting axis of the yoke.

* * * * *